US012676398B1

(12) United States Patent
Ortel et al.

(10) Patent No.: US 12,676,398 B1
(45) Date of Patent: Jul. 7, 2026

(54) REMOVABLE TRAY SYSTEM FOR FLOOR MOUNTED ANTENNA

(71) Applicant: Hubbell Incorporated (Delaware), Shelton, CT (US)

(72) Inventors: Tim Ortel, Monkton, MD (US); Stephen Powell, Baltimore, MD (US); Dennis Burrell, Cedar Park, TX (US)

(73) Assignee: Hubbell Incorporated, Shelton, CT (US)

( * ) Notice: Subject to any disclaimer, the term of this patent is extended or adjusted under 35 U.S.C. 154(b) by 343 days.

(21) Appl. No.: 18/232,410

(22) Filed: Aug. 10, 2023

Related U.S. Application Data

(60) Provisional application No. 63/397,686, filed on Aug. 12, 2022.

(51) Int. Cl.
*H01Q 1/22* (2006.01)
*E04F 15/02* (2006.01)
*E04F 15/024* (2006.01)

(52) U.S. Cl.
CPC ......... *H01Q 1/22* (2013.01); *E04F 15/02405* (2013.01); *E04F 2290/02* (2013.01)

(58) Field of Classification Search
CPC ... H01Q 1/22; E04F 15/02405; E04F 2290/02
See application file for complete search history.

(56) References Cited

U.S. PATENT DOCUMENTS

| | | | | |
|---|---|---|---|---|
| 5,909,195 A * | 6/1999 | Merenda | H01Q 21/08 343/815 |
| 8,350,775 B2 * | 1/2013 | Obermaier | H01Q 21/26 343/834 |
| 10,665,957 B1 * | 5/2020 | Seller | H01Q 21/061 |
| 2004/0150575 A1 * | 8/2004 | Lizalek | H01Q 13/10 343/789 |
| 2016/0118707 A1 * | 4/2016 | Burrell | H01Q 1/40 343/720 |
| 2018/0331428 A1 * | 11/2018 | Iino | H01Q 5/35 |
| 2020/0044338 A1 * | 2/2020 | Haziza | H01Q 3/38 |
| 2021/0126358 A1 * | 4/2021 | Seo | H01Q 21/24 |
| 2022/0069430 A1 * | 3/2022 | Cogoni | H01Q 1/2283 |

* cited by examiner

*Primary Examiner* — Hai V Tran
(74) *Attorney, Agent, or Firm* — Robinson + Cole LLP

(57) ABSTRACT

An antenna tray system includes a first tray for being disposed in a recess in a floor; a second tray disposed in the first tray; and an antenna PCB disposed in the second tray, the antenna PCB including antenna leads extending through the first and second trays and the floor for connection to an access point.

20 Claims, 6 Drawing Sheets

REMOVABLE TRAY SYSTEM FOR FLOOR MOUNTED ANTENNA

RELATED APPLICATION

This is a nonprovisional application claiming the priority of provisional application Ser. No. 63/397,686, filed on Aug. 12, 2022, hereby incorporated by reference.

FIELD OF THE INVENTION

The present invention is generally directed to access point antennas and particularly to antennas embedded in flooring.

BACKGROUND OF THE INVENTION

An access point (AP) is a networking hardware device that allows other Wi-Fi devices to connect to a wired network. As a standalone device, the access point may have a wired connection to a router. Access points are typically placed on ceilings and provide coverage down to the user. These access points come in two varieties in which the antennas are located internal to the access point housing or with connectors so that external antennas can be attached to the access point. As more technologies, such as DAS, CBRS, etc. are being used indoors, the real estate where these radios are being mounted is becoming congested. Other locations to put these radios are needed.

By embedding wireless communication antennas into a floor, wireless coverage can be provided while protecting/hiding the equipment and eliminating the need to mount equipment high above floor level. In more specific situations, such as providing wireless coverage for people in offices or for mobile robotics in warehouse environments, it is beneficial to have coverage closer to ground level.

Currently, floor antenna PCBs are permanently potted into individual tiles and used raise flooring systems. In order to upgrade or replace an antenna, the entire tile must be removed, discarded, and replaced by a new antenna tile.

U.S. Pat. No. 9,812,758 discloses an access point underneath a raised access flooring. In this arrangement, the access point is connected to an external antenna embedded in the top portion of the floor tile and cables go to the bottom of the tile via a hole cut in it and connected to the access point connectors. With the present invention, a receptacle tray can be embedded in a tile or into a recess cut into a poured concrete floor. A removable insert tray containing the potted antenna is fitted into the receptacle tray to provide ease of installation, maintenance, and upgrade to a system.

SUMMARY OF THE INVENTION

The present invention provides an antenna tray system, comprising a first tray for being disposed in a recess in a floor; a second tray disposed in the first tray; and an antenna PCB disposed in the second tray, the antenna PCB including antenna leads extending through the first and second trays and the floor for connection to an access point.

The present invention further provides an antenna tray assembly, comprising a tray having a bottom wall and a sidewall, the tray is shaped to nest on top of another tray disposed in a floor; and an antenna PCB disposed in the tray, the antenna PCB including antenna leads extending through the bottom wall, the antenna leads for connecting to an access point.

The present invention also provides an antenna floor tile for a raised floor system, comprising a tile including a recess; a first tray having a first bottom wall, the first tray being disposed in the recess in the tile; and a second tray holding an antenna PCB, the second tray being disposed in the first tray.

DETAILED DESCRIPTION OF THE INVENTION

Figure 1:
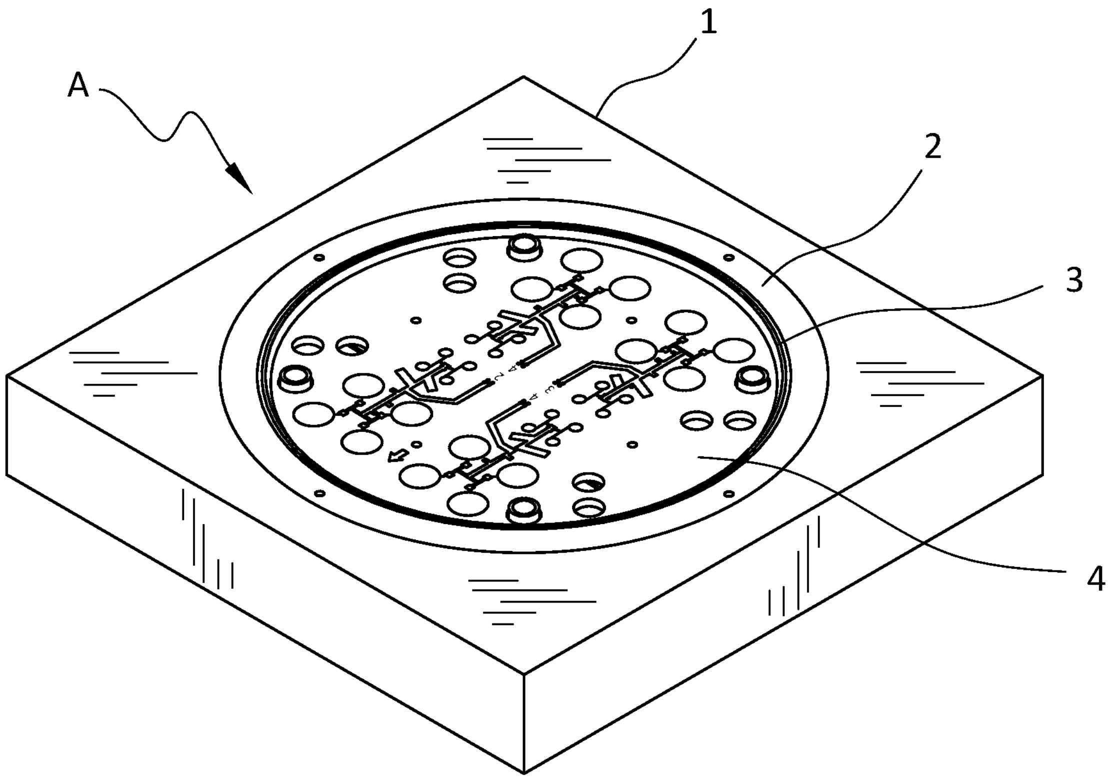
FIG. 1 is a perspective view of an antenna tray system in a concrete floor embodying the present invention.

Referring to FIG. 1, a removable tray system A for floor mounted antenna is disclosed. The antenna tray system A is shown installed in a floor 1. The floor 1 may be an individual tile in raised flooring or poured concrete or solid floor. A receptacle tray 2 is installed into a recess cut into the floor 1. An insert tray 3 containing an antenna PCB 4 is inserted into the receptable tray 2. The tray system A is modular in construction wherein the receptacle tray 2 remains attached to the floor while the insert tray 3 with its antenna PCB 4 may be removed and switched with another insert tray with a different antenna PCB. The modular feature advantageously provides flexibility for maintenance or upgrade purposes.

Although shown as circular trays, the trays 2 and 3 may be of different shapes, such as square, for example. The receptacle tray 2 is attached to the floor 1. The insert tray 3 houses the antenna PCB 4. The insert tray 3 fits into the receptacle tray 2 in a nesting manner. The receptacle tray 2 is operably attached to the floor 1 while the insert tray 3 can be installed, removed, and replaced with ease.

Figure 2:
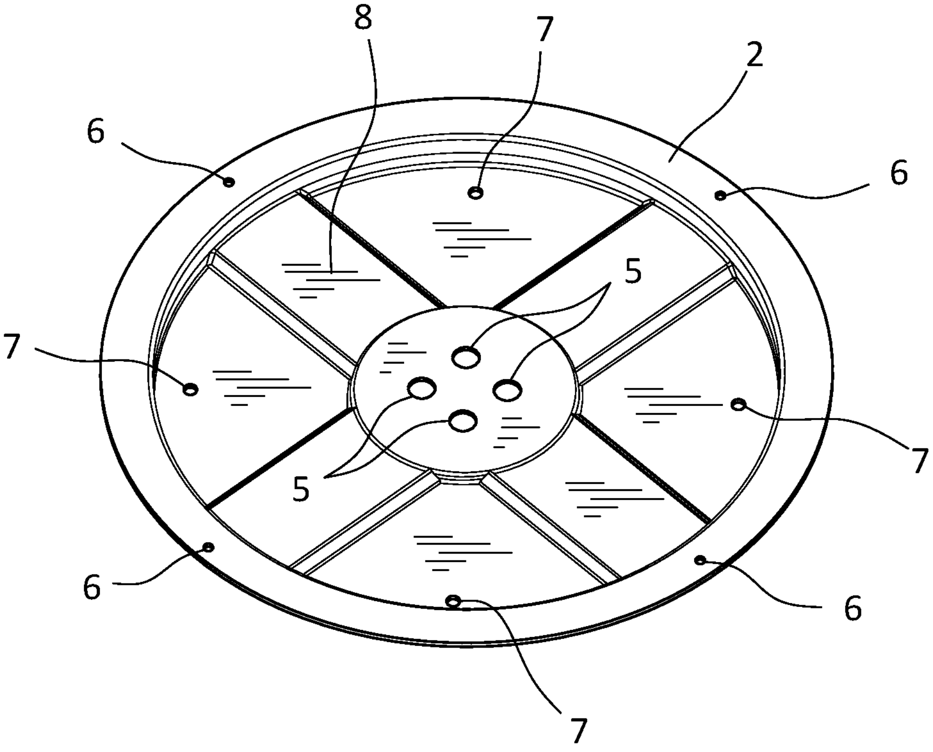
FIG. 2 is perspective view of a receptacle tray.
Figure 7:
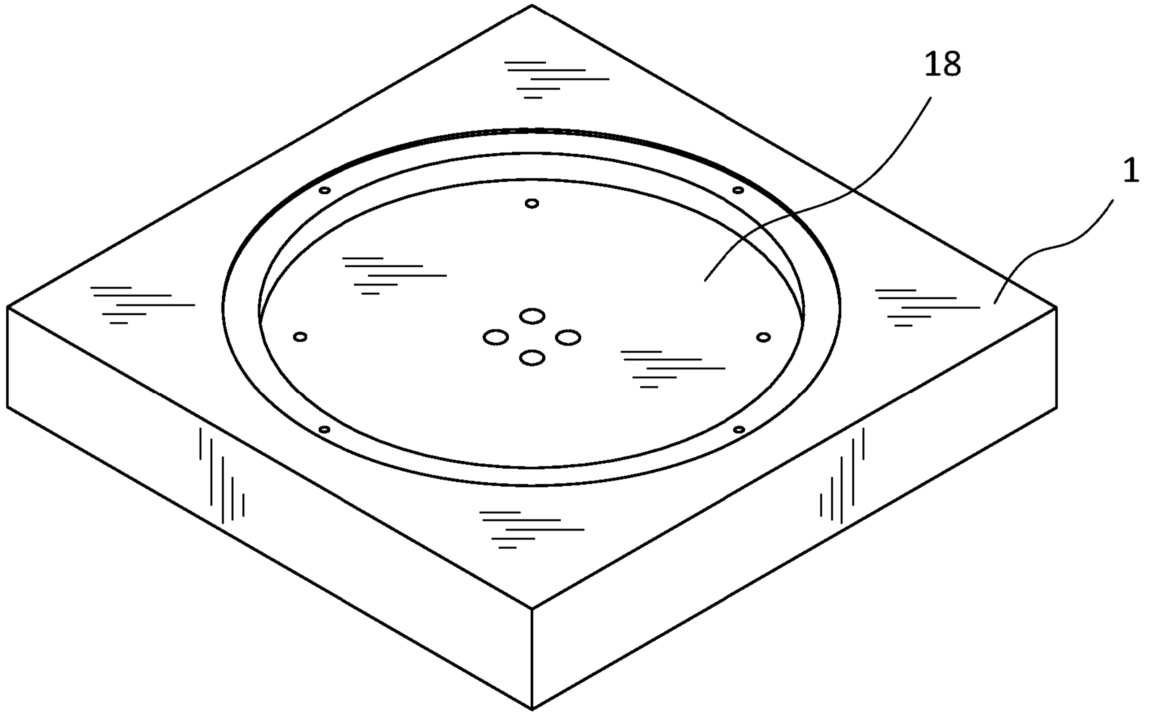
FIG. 7 is a perspective view of a floor with a recess for tray installation.
Figure 10:
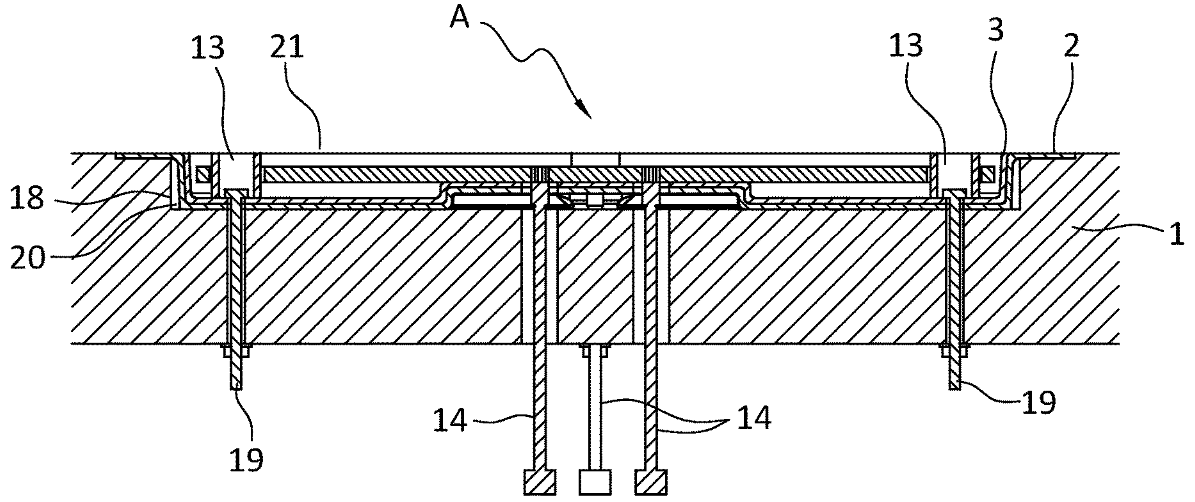
FIG. 10 is a cross-sectional view showing the antenna tray system installed in a floor.

FIG. 2 shows the receptacle tray 2 which is received in a recess 18 in the floor 1 (see FIGS. 7 and 10). The tray 2 includes a bottom wall, a sidewall, and a lip. It should be understood that the tray 2 may only include the bottom wall and the sidewall without the lip. The tray 2 contains holes 5 in its center to allow the passage of antenna leads 14 (see FIG. 10). Holes 6 on the outer lip of the tray 2 are used for fastening the tray to the floor 1 using anchor fasteners or other standard hardware. Holes 7 located in the bottom wall of the tray 2 are clearance holes for mounting bolts 19 (see FIG. 10) that fasten the complete tray system A to the floor.

The tray 2 is preferably molded plastic with a raised section 8 in the shape of an 'X', two raised portions intersecting at the center portion. The raised section 8 advantageously stiffens the tray's structure, giving it strength and reduces warping that could occur during molding as compared to a flat surface without the raised section. It should be understood that the raised section 8 may be of any other shape that provides structural rigidity to the bottom wall.

The recess 18 is preferably shallow and located in the floor where the tray system A is desired to be installed. The recess 18 may be cut into an individual floor tile (such as in a raised flooring system) or the recess may be cut into a poured concrete floor. A floor tile for the raised floor system may also be manufactured with a recess ready to receive the antenna tray system A. Holes in the recess that line up with the holes 5 to pass the antenna cables 14 are bored into the floor. Holes in the recess that line up with the holes 7 to fasten the insert tray 3 down to the floor are bored as well.

The receptable tray 2 may be bonded into the recess using construction adhesive. The clearance holes 6 in the lip of the receptacle tray 2 may also be used with anchor fasteners to fasten the receptable tray 2 to the floor.

Figure 3:
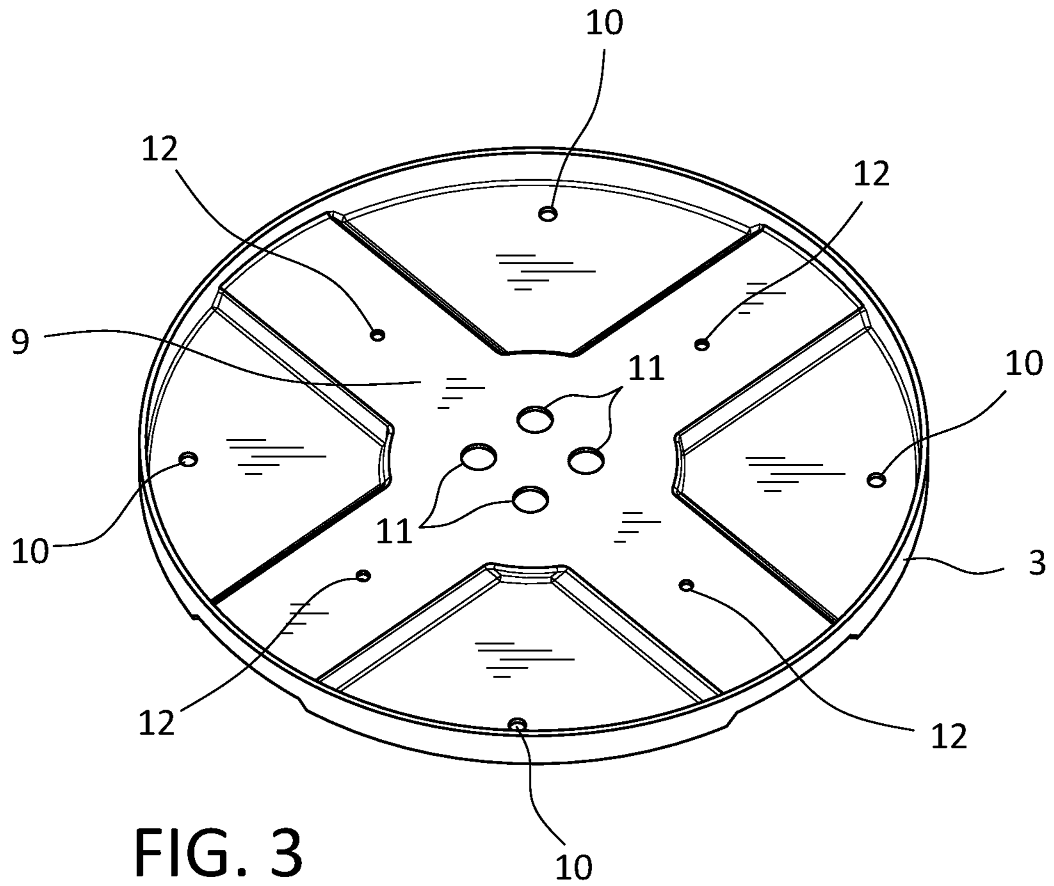
FIG. 3 is a perspective view of an insert tray for receiving an antenna PCB.

FIG. 3 shows the insert tray 3 which is designed to hold the antenna PCB 4. The insert tray is preferably molded with an 'X' shaped raised section 9. The insert tray 3 is shaped so that the insert tray 3 can nest into the receptacle tray 2. The raised section 9 is conformed to the shape of the raised section 8 so that the bottom wall of the tray 3 rests on top of the bottom wall of the tray 2, and the raised section 9 on top of the raised section 8. The tray 3 has holes 10 that line up with the holes 7 for the mounting bolts 19 and holes 11 that line up with the hoses 5 in the receptacle tray 2 for the antenna leads 14 to pass through the floor. Holes 12 located on the raised section 9 allow the antenna PCB 4 to be aligned and fastened to the insert tray 3 via fasteners.

Figure 4:
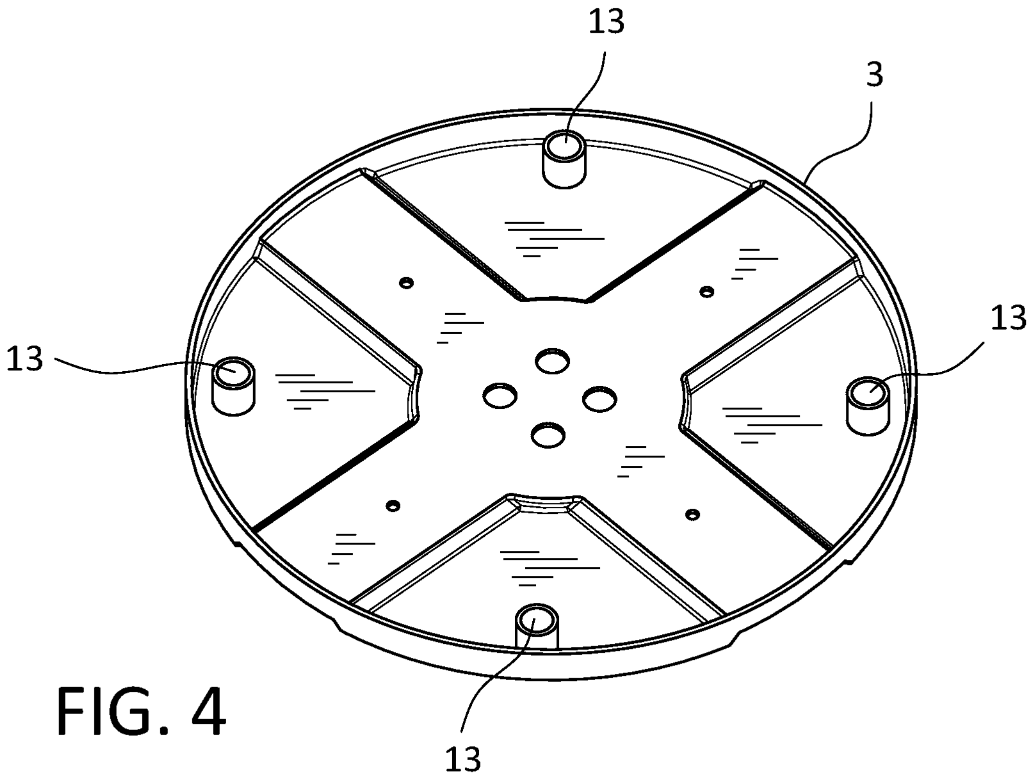
FIG. 4 is the insert tray shown in FIG. 3 with bolt access tubes glued to the bottom wall.

In FIG. 4, the insert tray 3 is provided with tubes 13 glued concentric to the holes 10 for the mounting bolts 19. The tops of the tubes 13 are flush with the rim of the tray 3. When the antenna PCB 4 is positioned in the insert tray 3, an epoxy resin is poured to fill the tray 3 and cover the PCB 4. The tubes 13 advantageously prevent the bolt holes 10 and 7 from being covered by the epoxy resin, thus allowing the mounting bolts 19 to be installed or removed with ease.

Figure 5:
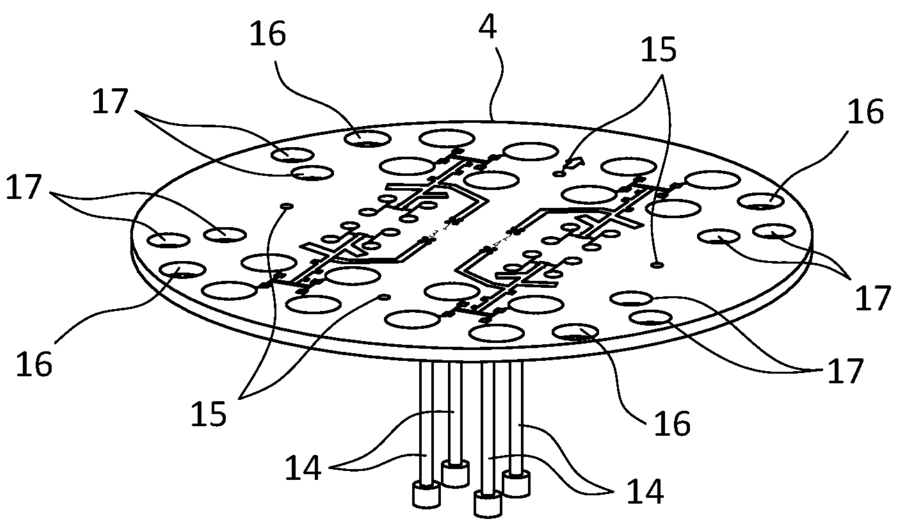
FIG. 5 is a perspective view of an antenna PCB.

In FIG. 5, the antenna PCB 4 includes antenna leads 14 extending out of the bottom of the PCB. The antenna leads 14 are used to connect the antenna PCB 4 to a wireless access point radio (not shown). Holes 15 in the PCB line up with the holes 12 in the in the insert tray 3. Holes 16 are clearance holes for the bolt access tubes 13. The tubes 13 extend above the PCB 4 to advantageously prevent the epoxy resin from filling up the holes 10. Holes 17 are milled in the PCB 4 to allow the poured epoxy resin to fill the insert tray 3 underneath the PCB 4 and advantageously prevent air bubbles underneath the PCB 4, as shown in FIG. 10.

Figure 6:
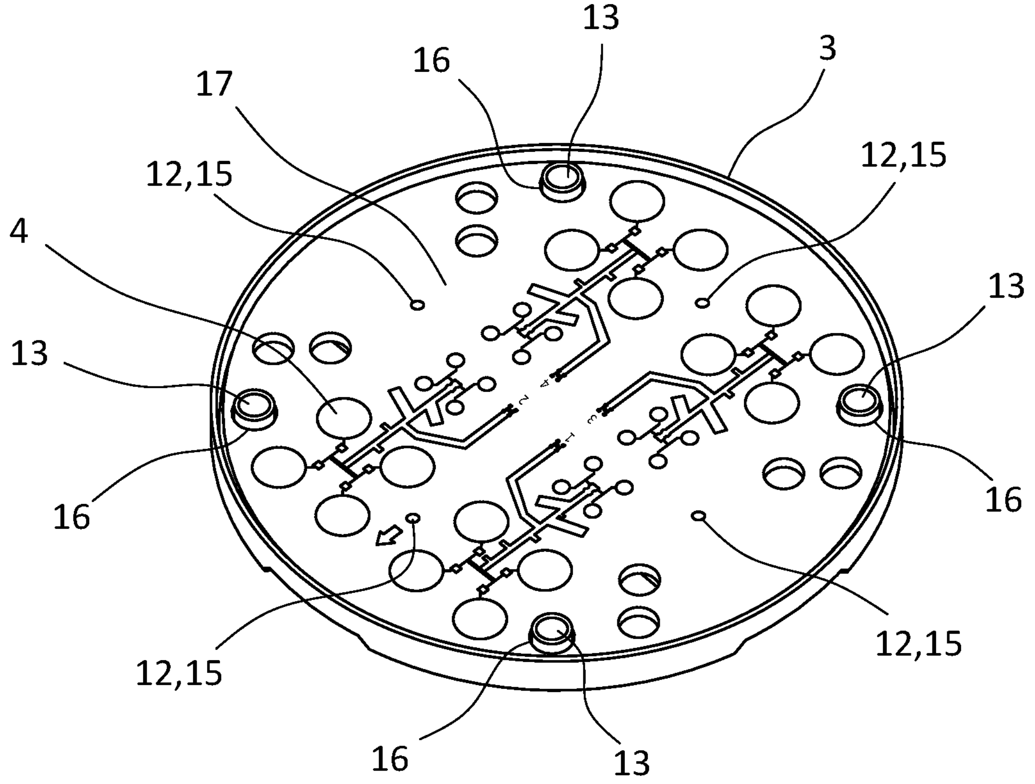
FIG. 6 is a perspective of the antenna PCB positioned in the inset tray.

Referring to FIG. 6, the antenna PCB 4, which may be circular or other shapes, is potted in epoxy resin within the tray insert 3 (see also FIG. 10). The tray insert 3 includes the holes 11 to pass the antenna leads 14 of the antenna PCB 4 through. The holes 12 and 16 advantageously allow the fixturing of the PCB 4 to the insert tray 3 prior to the pouring of epoxy resin. The holes 10 in the bottom wall of the insert tray 3 allow the mounting bolts 19 to pass through into the concrete floor. The tubes 13 bonded concentric to the bolt clearance holes 10 advantageously prevent the poured epoxy resin from covering access to the bolts 19 for easy removal for maintenance of antenna PCB 4. The assembly of the insert tray 3 and the antenna PCT 4 when potted with epoxy resin becomes a single unit, readily removable for maintenance or upgrade purposes.

In FIG. 6, the antenna PCB 4 is shown inside the insert tray 3. Aligning the holes 15 in the antenna PCB and the holes 12 in the insert tray 3 locates the position of the PCB 4. Additional fasteners may be inserted in the holes 15 and 12 to affix the two together. The bolt access tubes 13 freely pass through the holes 16 in the PCB 4. The top of the PCB sits a distance below the top of the bolt access tubes 13 and the rim of the insert tray 3 to provide room for the epoxy resin to cover the PCB 4. The epoxy resin 21 (see FIG. 10) is poured in the antenna insert tray to completely cover the PCB and fill the tray 3. The holes 17 allow the epoxy resin to flow to underneath the PCB 4. The tray 3 and the antenna PCB 4 are advantageously assembled together so the end user will only receive and handle the final assembly as a single component.

FIG. 7 illustrates the floor 1 that has been prepared for installation of the antenna tray system A. The floor may be either a solid/poured floor or an individual tile for a raised flooring system. The recess 18 is created in the floor. The holes in the floor 1 are matched and aligned with the holes 5 and 11 in the receptacle tray 2 and the insert tray shown in FIGS. 2 and 3.

Figure 8:
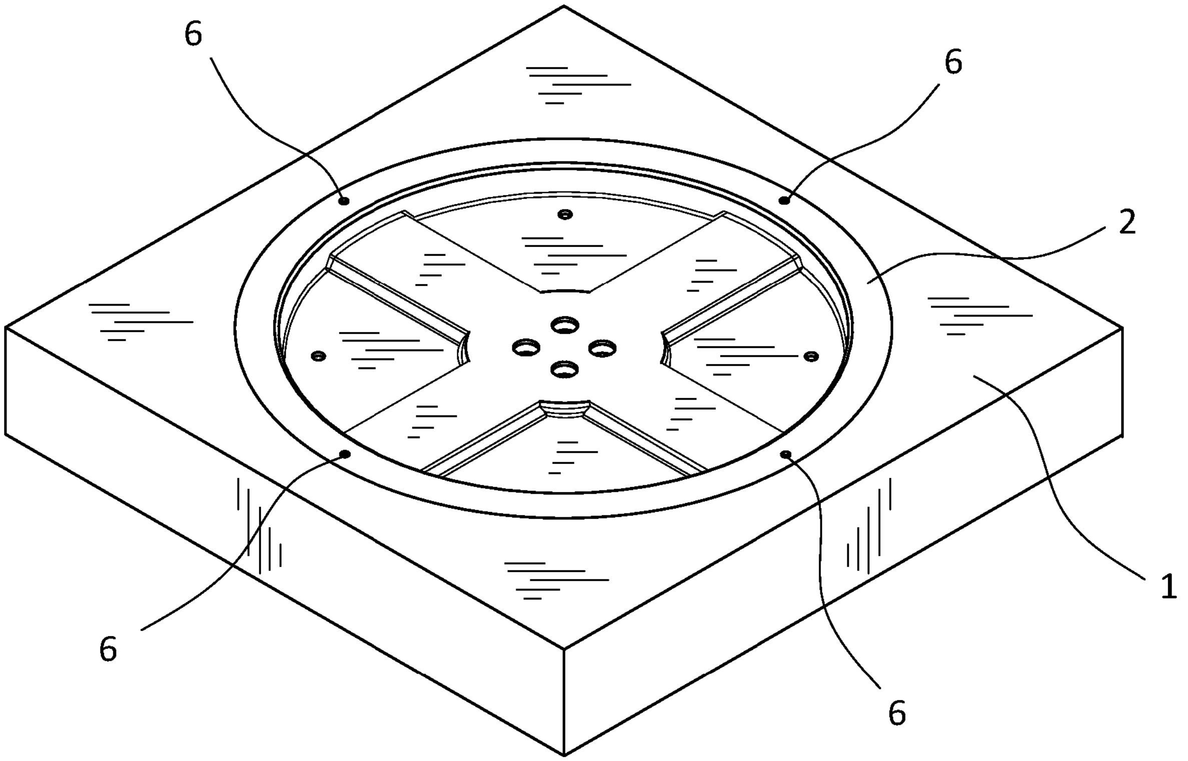
FIG. 8 is a perspective view of the floor with the receptacle tray installed into the recess.

FIG. 8 shows the receptacle tray 2 installed into the recess 18 of the floor 1. Anchor fasteners may be inserted into the holes 6 on the lip of the tray 2 to affix to the floor. Additionally, construction adhesive may be used between the receptacle tray 2 and floor recess 18 to securely bond the tray to the floor.

Figure 9:
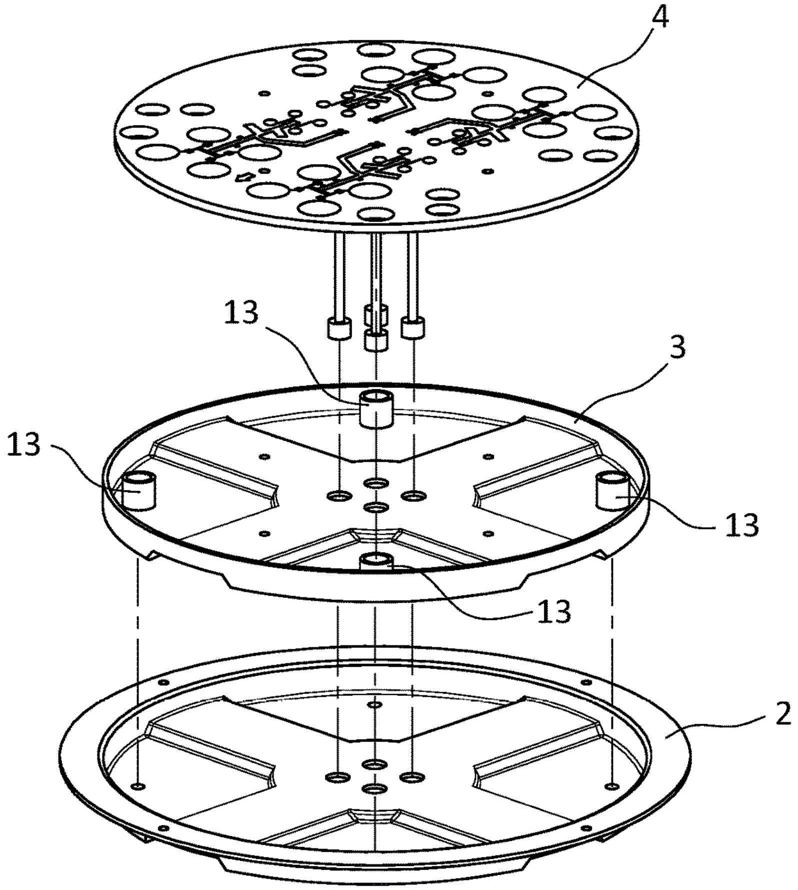
FIG. 9 is an exploded view showing the alignment of receptacle tray, insert tray and the antenna PCB to allow for nesting during assembly.

FIG. 9 an exploded view showing the alignment of receptacle tray, insert tray and the antenna PCB to allow for nesting of insert tray 3 and receptacle tray 2 during assembly. The alignment of the various holes, including the bolt access tubes 13 is shown.

Both the receptacle tray 2 and the insert tray 3 fit together in a nesting self-fixturing fashion. Each tray has the 'X' shaped section 8 and 9 molded in the center, which allows the insert tray 3 to self-fixture within the receptacle tray 2. The 'X' shaped sections also strengthens the trays and eliminates warpage in a thermoforming or molding manufacturing process that would result from a part with a large flat surface.

FIG. 10 is a cross-sectional view showing the complete antenna tray system installed in the floor recess 18. The insert tray 3 with the antenna PCB 4 and the poured epoxy resin 21 is nested in the receptacle tray 2. The bolts 19 can be seen inside the bolt access tubes 13 of the insert tray. The head of the bolts 19 are advantageously accessible through the tube 13 for replacing the antenna PCB 4 and the insert tray 3 during maintenance. The antenna leads 14 are routed below the concrete 1 to connect to a wireless access point radio (not shown). Construction adhesive 20 may be used in between the receptacle tray 2 and the floor recess 18 for added security.

Figure 11:
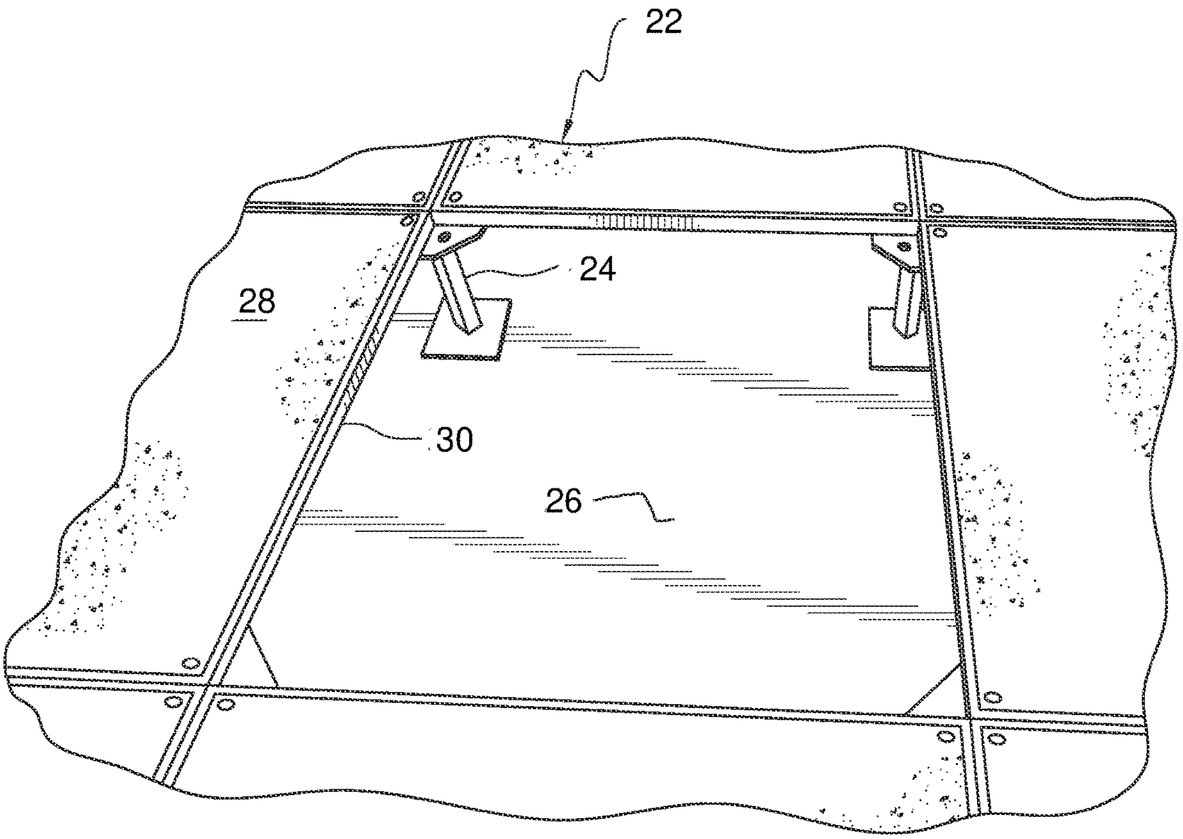
FIG. 11 is a perspective view of a conventional raised floor system showing one tile removed.

FIG. 11 shows a conventional raised floor system 22 in which the antenna tray system A when incorporated in a floor tile may be used. A plurality of pedestals 24 supported on a subfloor 26 of a building are arranged to support a plurality of floor tiles 28. A typical floor tile 28 is typically 24"×24"×1.25" made of a metal tray 30 filled with concrete. The raised floor system 22 provides space below the floor tiles 28 for routing power and communication cables, pipes, HVAC, and other amenities to various points on the floor. The floor tiles 28 are easily removable individually by lifting to gain access to the space 30 below.

To install, the recess 18 in the floor is provided by the end user. The sets of holes-holes to secure the receptacle tray 2 and clearance holes for the antenna leads and bolts—may be marked and drilled using the receptacle tray 2 as a template. The recess 18 may also be provided during manufacture of a raised floor tile for a raised floor system.

The insert tray 2 is placed into the recess 18. Construction adhesive may be applied between the bottom of the receptacle tray 2 and recess 18 to secure the insert tray to the recess. Anchor fasteners may be installed in the holes located on the lip of the receptacle tray 2 may also be used to secure the insert tray to the floor.

The antenna leads 14 of the antenna PCB 4 are passed through their respective holes in the floor. The completed assembly of the insert tray 3 and the antenna PCB 4 is placed into the receptacle tray 2. The mounting bolts 19 are placed into the bolt access tubes 13 and fastened to the floor. The antenna leads 14 are then connected to a wireless access point radio (not shown).

In the event of maintenance or upgrade, the mounting bolts 19 are removed and the assembly of the insert tray 3 and the antenna PCB 4 is removed. A replacement insert tray assembly is then placed into the receptacle tray 2 and the mounting bolts 19 reinstalled.

By embedding wireless communication antennas into a floor, wireless coverage can be provided while protecting/hiding the equipment and eliminating the need to mount equipment high above floor level. In more specific situations, such as providing wireless coverage for people in offices or for mobile robotics in warehouse environments, it is beneficial to have coverage closer to ground level.

A removable insert tray assembly containing the potted antenna can be fitted into the receptacle tray to provide ease of installation, maintenance, and upgrade to a system.

The antenna tray system A is relatively smaller and much lighter, providing benefits for handling and during maintenance and also easier to manufacture, ship, and stock. The receptacle tray 2 which is bonded to the floor can be reused over multiple antenna upgrades. The insert tray 3 can be a universal part where multiple types of antenna PCBs can be accommodated in the tray. Overall, the antenna tray system is a more universal system for antenna installation and is more versatile as it can be used in raised flooring tiles as well as in solid floors.

While this invention has been described as having preferred design, it is understood that it is capable of further modifications, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. An antenna tray system, comprising:

a) a first tray for being disposed in a recess in a floor;

b) a second tray disposed in the first tray; and c) an antenna PCB disposed in the second tray, the antenna PCB including antenna leads extending through the first and second trays and the floor for connection to an access point.

2. The antenna tray system as in claim 1, wherein the first tray includes a first bottom wall and a first sidewall.

3. The antenna tray system as in claim 2, wherein the second tray includes a second bottom wall and a second sidewall.

4. The antenna tray system as in claim 1, wherein the second tray is nested in the first tray.

5. The antenna tray system as in claim 1, wherein the first tray and the second tray include respective bottom walls with respective nesting raised sections.

6. The antenna tray system as in claim 5, wherein the respective nesting raised sections are "X" shaped.

7. The antenna tray system as in claim 5, wherein the antenna PCB is supported on the raised section of the second tray.

8. The antenna tray system as in claim 7, wherein the second tray includes bolt access tubes disposed through the antenna PCB and epoxy resin for access to bolts for attaching the second tray to the floor.

9. The antenna tray system as in claim 1, wherein the first tray and the second tray are circular in shape.

10. The antenna tray system as in claim 1, wherein the second tray is filled with epoxy resin to cover the antenna PCB.

11. The antenna tray system as in claim 1, wherein the second tray is removable from the first tray as a single unit for replacement with another second tray with another antenna PCB.

12. An antenna tray assembly, comprising:

a) a tray having a bottom wall and a sidewall, the tray is shaped to nest on top of another tray disposed in a floor; and b) an antenna PCB disposed in the tray, the antenna PCB including antenna leads extending through the bottom wall, the antenna leads for connecting to an access point.

13. The antenna tray assembly as in claim 12, wherein the tray is filled with epoxy resin to cover the antenna PCB.

14. The antenna tray assembly as in claim 13, wherein the tray includes bolt access tubes disposed through the antenna PCB and epoxy resin for access to bolts for attaching the tray to the floor.

15. The antenna tray assembly as in claim 12, wherein an outer surface of the side wall defines an outermost perimeter of the tray and an inner surface of the side wall at least partially surrounds an inner volume of the tray, wherein the antenna PCB is disposed within the inner volume and contacts the first bottom wall, and wherein a bolt access tube extends from the first bottom wall and is received through an opening in the antenna PCB.

16. An antenna floor tile for a raised floor system, comprising:

a) a tile including a recess;

b) a first tray having a first bottom wall, the first tray being disposed in the recess in the tile; and c) a second tray holding an antenna PCB, the second tray being disposed in the first tray, wherein the second tray is removable from the first tray.

17. The antenna floor tile as in claim 16, wherein the antenna includes antenna leads extending through the tile for connection to an access point.

18. The antenna floor tile as in claim 16, wherein the second tray is filled with epoxy resin to cover the PCB.

19. The antenna floor tile as in claim 18, wherein fasteners for attaching the second tray to the tile are not covered by the epoxy resin so as to be accessible when removing the second tray from the first tray.

20. The antenna floor tile as in claim 16, wherein the second tray includes a second bottom wall that is removably coupled to the first bottom wall, wherein the antenna PCB is coupled to the second bottom wall, and wherein the first tray is fixed within the recess.

* * * * *